US006985285B2

(12) United States Patent
Tanaka

(10) Patent No.: US 6,985,285 B2
(45) Date of Patent: Jan. 10, 2006

(54) OPTICAL TRANSMISSION SYSTEM USING RAMAN AMPLIFICATION

(75) Inventor: Toshiki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 10/281,317

(22) Filed: Oct. 28, 2002

(65) Prior Publication Data

US 2003/0174389 A1 Sep. 18, 2003

(30) Foreign Application Priority Data

Mar. 12, 2002 (JP) ............................. 2002-066430

(51) Int. Cl.
H01S 3/00 (2006.01)
(52) U.S. Cl. ................................. 359/337.5; 359/334
(58) Field of Classification Search ............. 359/337.5, 359/334; 398/81, 148, 159
See application file for complete search history.

(56) References Cited

U.S. PATENT DOCUMENTS

| 6,519,078 | B2 * | 2/2003 | Miyakawa et al. | ......... 359/334 |
| 6,532,102 | B2 * | 3/2003 | Kobayashi et al. | ......... 359/334 |
| 6,574,038 | B2 * | 6/2003 | Tanaka et al. | ........... 359/337.5 |
| 6,606,188 | B2 * | 8/2003 | Shimojoh | .................... 359/334 |
| 6,614,586 | B2 * | 9/2003 | Hayee et al. | ................ 359/334 |
| 6,618,195 | B2 * | 9/2003 | Shieh et al. | ........... 359/341.33 |
| 6,687,047 | B2 * | 2/2004 | Clark et al. | .............. 359/341.1 |
| 6,693,740 | B2 * | 2/2004 | Gray et al. | ............... 359/337.4 |
| 6,771,864 | B2 * | 8/2004 | Kubo et al. | .................. 385/123 |
| 2002/0105719 | A1 * | 8/2002 | Tanaka et al. | ........... 359/337.5 |
| 2002/0131160 | A1 * | 9/2002 | McNicol | .................... 359/337.5 |
| 2003/0011874 | A1 * | 1/2003 | Nakamoto et al. | .......... 359/334 |

FOREIGN PATENT DOCUMENTS

| JP | 08-018540 | 1/1986 |
| JP | 8-116307 | 5/1996 |
| JP | 8-331049 | 12/1996 |
| WO | WO 02/19576 A2 | 3/2002 |

OTHER PUBLICATIONS

M. Murakami et al., "Long-Haul 16 x 10 WDM Transmission Experiment Using Higher Order Fiber Dispersion Management Technique", ECOC '98, pp. 313-314. 1998.
C. R. Davidson, et al., "1800 Gb/s Transmission of One Hundred and Eighty 10 Gb/s WDM Channels Over 7,000 km using the Full EDFA C-Band" OFC 2000, PD25.
M. Murakami, et al., "Long-Haul WDM Transmission Using Higher Order Fiber Dispension Management", Journal of Lightwave Technology, vol. 18, No. 9, Sep. 2000 (pp. 1197-1204).
French Search Report for corresponding French Application dated Jul. 23, 2004.

* cited by examiner

Primary Examiner—Jack Keith
Assistant Examiner—Deandra M. Hughes
(74) Attorney, Agent, or Firm—Staas & Halsey LLP

(57) ABSTRACT

An optical transmission system that can reduce a difference of Raman gain between each of upstream and downstream lines, in a system configuration in which Raman amplification is performed for both the upstream and downstream lines by a common Raman amplifier. Transmission sections are provided for both the upstream and downstream lines, and when pumping light, generated by a common pumping light source, is supplied to the transmission sections of the one line and the transmission sections of the other line, the negative dispersion fibers having different wavelength dispersion values are applied to the positive and negative hybrid transmission paths used for the transmission sections of each line, so that the length of each negative dispersion fiber is made substantially equal to each other.

11 Claims, 10 Drawing Sheets

OPTICAL TRANSMISSION SYSTEM USING RAMAN AMPLIFICATION

BACKGROUND OF THE INVENTION

1. Field of the Invention

The present invention relates to an optical transmission system for Raman amplifying signal light to transmit the amplified signal light, in particular, to an optical transmission system for Raman amplifying signal light by supplying pumping light generated by a Raman amplifier common to both an upstream line and a downstream line.

2. Description of the Related Art

With conventional long distance light transmission systems, optical transmission has been performed using optical regeneration repeaters that convert optical signals into electric signals to effect re-timing, re-shaping, and re-generating. However recently, with progress in the utilization of optical amplifiers, optical amplifying-and-repeating transmission systems that use optical amplifiers as linear repeaters are being investigated. By replacing an optical regeneration repeater with an optical amplification repeater, the number of parts in the repeater can be greatly reduced, with the expectation of maintaining reliability and greatly reducing costs. Furthermore, as one method of realizing a large capacity of an optical transmission system, a wavelength division multiplexing (WDM) optical transmission system that multiplexes two or more optical signals having different wavelengths to transmit the multiplexed light on a single optical transmission path is attracting attention.

In a WDM optical amplifying-and-repeating transmission system configured by combining a WDM optical transmission system with an optical amplifying-and-repeating transmission system, it is possible to collectively amplify two or more optical signals having different wavelengths using an optical amplifier, thus enabling the realization of large capacity and long distance transmission with a simple (economic) construction.

FIG. 11 is a diagram showing an exemplary configuration of a conventional WDM optical amplifying-and-repeating transmission system.

The system in FIG. 11 comprises, for example, an optical sender station 101, an optical receiver station 102, an optical transmission path 103 connecting between the sender station and the receiver station, and a plurality of optical repeater stations arranged along the optical transmission path 103 at required intervals. The optical sender station 101 has a plurality of optical senders (E/O) 101A that output a plurality of optical signals having different wavelengths respectively, a multiplexer 101B that wavelength multiplexes the plurality of optical signals, and a postamplifier 101C that amplifies WDM signal light from the multiplexer 101B to a required level and outputs it to the optical transmission path 103. The optical receiver 102 includes a preamplifier 102C that amplifies the WDM signal light of each wavelength band transmitted via the optical transmission path 103 to a required level, a demultiplexer 102B that demultiplexes the output light from the preamplifier 102C into a plurality of optical signals according to the wavelengths, and a plurality of optical receivers (O/E) 102A that receive the plurality of optical signals, respectively. The optical transmission path 103 includes a plurality of transmission sections that connect between the optical sender station 101 and the optical receiver station 102. The WDM signal light sent from the optical sender 101 is propagated through the optical transmission path 103, optically amplified at the optical repeater station 104 arranged at each transmission section, and then propagated through the optical transmission path 103 again, and thereafter, the WDM signal light is transmitted to the optical receiver section 102 by repeating the above steps.

As the optical repeater station 104 in the WDM optical amplifying-and-repeating transmission system described above, for example, an erbium doped optical fiber amplifier (EDFA) is typically used. Also, the use of EDFA in combination with Raman amplification is extensively considered recently. Further, a repeaterless optical transmission system that does not use the optical repeater station is proposed, wherein remote-pumping that controls distributed Raman amplification and the like is considered.

In the Raman amplification using an optical fiber as an amplification medium, a gain to be obtained is in inverse proportion to a mode field diameter of the used optical fiber. Therefore, an optical fiber having a smaller mode field diameter is suitable for Raman amplification. For example, a negative dispersion fiber having wavelength dispersion and a dispersion slope (first-order differential of wavelength dispersion with respect to the wavelength) of sign opposite to wavelength dispersion and a dispersion slope of 1.3 $\mu$m zero dispersion fiber, is of the mode field diameter of about 5 $\mu$m smaller than the mode field diameter of the 1.3 $\mu$m zero dispersion fiber or a dispersion-shifted fiber (DSF, NZ-DSF) typically used as the optical transmission path. Therefore, larger Raman gain can be obtained.

Here, the positive dispersion fiber such as the 1.3 $\mu$m zero dispersion fiber or the dispersion-shifted fiber is abbreviated as +D fiber, and the negative dispersion fiber as mentioned above is abbreviated as −D fiber in the following description.

Further, in the conventional WDM optical repeating transmission system, a method for managing the wavelength dispersion of the optical transmission path has been used in order to reduce degradation of transmission characteristics of the optical transmission path due to a nonlinear effect. For example, in article 1; "Long-haul 16×10 WDM transmission experiment using higher order fiber dispersion management technique", M. Murakami et al., pp. 313–314, ECOC'98, 1998, there is proposed a technique for compensating for, in one transmission section (a compensation section) using the +D fiber, cumulative dispersion occurred in a plurality of transmission sections using a hybrid transmission path in which the +D fiber and the −D fiber are combined. More specifically, an average zero-dispersion wavelength of the optical transmission path shown in the article 1 is about 1551 nm, and a signal light wavelength is 1544.5 nm–556.5 nm. Further, the respective wavelength dispersion of each transmission section using the hybrid transmission path and the compensation section using the +D fiber are about −2 ps/nm/km and about +20 ps/nm/km, respectively. According to such configuration, since a group speed between signal light and spontaneous emission light and a group speed among a plurality of signal light are different from each other, an interaction time by the nonlinear effect can be shortened, thereby enabling to reduce the degradation of the transmission characteristics due to four wave mixing (FWM), cross phase modulation (XPM) and the like. Further, since the average zero-dispersion wavelength is kept within signal light wavelength, the degradation of the transmission characteristics due to self wave modulation (SPM) and the wavelength dispersion can also be reduced.

When a distributed Raman amplifier is applied to the conventional WDM optical repeating transmission system described above, it is difficult to obtain a Raman gain efficiently by using the +D fiber, since the +D fiber has a larger mode field diameter than the −D fiber. As a result, there is caused a problem in that significantly large pumping light power is needed to obtain the Raman gain required to compensate for losses in sections using the +D fiber, causing a disadvantage in terms of reliability of pumping light source and the like. To overcome the above problem, for example, it is contemplated to apply a Raman amplification fiber having a smaller mode field diameter and shorter length than the −D fiber so that the Raman gain can be obtained more efficiently to compensate for the losses in the sections of the +D fiber.

However, when the fiber for Raman amplification having the smaller mode field diameter as described above is used, there is caused a problem in that the nonlinear effect occurring in the fiber for Raman amplification on signal light may be increased. Further, there is caused a disadvantage in that many types of optical amplifiers must be used since configurations for realizing the distributed Raman amplification in the −D fiber and for realizing concentrated Raman amplification in the fiber for Raman amplification are needed. Still further, there may be a problem in that distortion of a transmission waveform may be increased due to the nonlinear effect in the entire optical transmission system.

As another method for managing the wavelength dispersion by using the hybrid transmission path configured by the combination of the +D fiber and the −D fiber, there is proposed, as shown, for example, in article 2; "1800 Gb/s transmission of one hundred and eighty 10 Gb/s WDM channels over 7,000 km using the full EDFA C-band", C. R. Davidson et al., PD25, OFC2000, 2000, and the like, a method in which the cumulative wavelength dispersion per one section of the hybrid transmission path is reduced to substantially zero and the cumulative dispersion that may occur during transmission is compensated at a terminal station.

However, when the cumulative wavelength dispersion per one section of the hybrid transmission path is reduced to substantially zero, wavelength degradation due to SPM can be alleviated, but, on the other hand, wavelength degradation due to XPM may cause a problem, since a state in which the bit arrangements among wavelengths become the same in regions experiencing the same amount of the nonlinear effect may occur in each transmission section.

In consideration of the above problems, the inventors of the present application have proposed a technique for compensating for wavelength dispersion by configuring a optical transmission path by combining a hybrid transmission path in which positive cumulative wavelength dispersion is caused with a hybrid transmission path in which negative cumulative wavelength dispersion is caused, in the optical transmission system (Japanese Patent Application 2001-075721).

FIG. 12 is a diagram showing an exemplary configuration of the optical transmission system according to the prior application mentioned above. In this system configuration, same pumping light sources are used for both upstream and downstream lines at each optical repeater station and a unitary system set up of the upstream and downstream lines is pumped by one Raman amplifier to perform Raman amplification. According to such a configuration, since pumping light is incident to the −D fiber in all transmission sections, it is possible to obtain the Raman gain efficiently and also to reduce the types of optical amplifier to one type.

However, in the optical transmission system as shown in FIG. 12, when the distributed Raman amplification is performed in each transmission section, in the upstream and downstream lines, there appears portions where two types of the transmission sections in which average wavelength dispersion is opposite to each other in positive/negative sign are pumped by the common Raman amplifier, as shown in FIG. 13, for example. Therefore, there is caused a disadvantage in that it is difficult to control the Raman gain in each line Namely, in order to adjust the wavelength dispersion, the −D fiber of each transmission section in which average wavelength dispersion is positive abbreviated as the sign "+" in FIG. 13, is set to be different in length from the −D fiber of each transmission section in which average wavelength dispersion is negative abbreviated as the sign "−" in FIG. 13. As a consequence, if one common Raman amplifier is used for both the upstream and downstream lines in each repeater as shown in FIG. 12, there appears portions where two types of the transmission sections in which the average wavelength dispersion is opposite to each other in positive/negative sign are pumped by the common Raman amplifier, as shown in FIG. 13, as shown in the parts enclosed by dotted lines in FIG. 13.

FIG. 14 is an illustrative diagram showing the parts enclosed by dotted lines in FIG. 13 in an enlarged manner. Here, pumping light output from a pumping light source 200 is branched into two by an optical coupler 201. One branched light is supplied via a multiplexer 202A from the side of a −D fiber 203B to a transmission section of the upstream line, in which the lengths of a +D fiber 203A and the −D fiber 203B are adjusted so that average wavelength dispersion has negative sign. The other branched light is supplied via a multiplexer 202B from the side of the −D fiber 203B to the other transmission section of the downstream line, in which the lengths of the +D fiber 203A and the −D fiber 203B are adjusted so that average wavelength dispersion for the section has positive sign. At this time, the Raman gain caused in each transmission section of the upstream and downstream lines, differs significantly between the upstream line side and the downstream line side, since an absolute value thereof is changed according to the length of the −D fiber 203B.

As a specific example, in order to set average wavelength dispersion to −2.7 ps/nm/km for a transmission section of 50 km, the lengths of the +D fiber 203A and the −D fiber 203B may be set to 32.5 km and 17.5 km, respectively. On the other hand, in order to set the average wavelength dispersion to +2.7 ps/nm/km for the transmission section of 50 km, the lengths of the +D fiber 203A and the −D fiber 203B may be set to 36.7 km and 13.3 km, respectively. Here, assuming that the transmission section of the upstream line, in which the average wavelength dispersion is set to −2.7 ps/nm/km, and the transmission section of the downstream line, in which the average wavelength dispersion is set to +2.7 ps/nm/km, are pumped by the common Raman amplifier, a difference of the Raman gain between the upstream line and the downstream line is about 0.5 dB according to calculation using parameters shown in Table 1 below.

TABLE 1

| Fiber | +D/−D fibers (upstream line) | +D/−D fibers (downstream line) |
|---|---|---|
| Average wavelength dispersion (ps/nm/km) | −2.7 | +2.7 |
| Length (km) | 32/18 | 36/14 |
| Nonlinear effective cross-sectional area ($\mu m^2$) @ signal light wavelength | 110/18 | ← |

TABLE 1-continued

| Fiber | +D/−D fibers (upstream line) | +D/−D fibers (downstream line) |
|---|---|---|
| Nonlinear effective cross-sectional area ($\mu m^2$) @ pumping light wavelength | 106/15 | ← |
| Transmission losses (dB/km) @ signal light wavelength | 0.18/0.28 | ← |
| Transmission losses (dB/km) @ pumping light wavelength | 0.22/0.55 | ← |
| Nonlinear refractive index coefficient ($\times 10^{-20}$ $m^2$/W) | 2.8/4 | ← |
| Raman gain coefficient ($\times 10^{-14}$ m/W) | 1.7/3.4 | ← |

Further, in the optical transmission system in which the distributed Raman amplification is performed by pumping each transmission section of the upstream and downstream lines using the common Raman amplifier, there is caused a disadvantage in that it is difficult to control the Raman gain when any failure occurs and the like, irrespective of whether the hybrid transmission path is applied or not.

Namely, for example, as shown in FIG. 15, assuming that a failure occurs in the optical transmission path in the neighborhood of optical repeater station, a required optical fiber (shown by dashed lines in the figure) may be inserted at the point of the failure for the purpose of repair and the like. At this time, if each of the transmission sections of the upstream and downstream lines has been pumped by the common Raman amplifier, the Raman gain in the transmission section into which the optical fiber has been inserted (at the upstream side in FIG. 15) will differ from the Raman gain in the transmission section into which the optical fiber has not been inserted (at the downstream side in FIG. 15), thereby it becomes difficult to control the Raman gain in the entire optical transmission system. Further, if any measure such as, for example, to reduce the power supplied by the Raman amplifier corresponding to the transmission section into which the optical fiber has been inserted is taken, in order to eliminate an influence on the entire system at the time of the failure and the like as described above, there is caused a problem in that an optical SNR of the transmitted light is degraded.

In addition, in the optical transmission system in which the distributed Raman amplification is performed by pumping each of the transmission sections of the upstream and downstream lines using the common Raman amplifier, there is also caused a problem with regard to a supervisory device. In general, in the optical transmission system, the supervisory device for transferring a supervisory signal indicating transmission conditions of signal light and the like on the system to control an operation of each optical repeater station is provided. The supervisory signal mentioned above is transferred among each optical repeater station, for example, by modulating the pumping light for amplifying the signal light to be superimposed on the signal light. Therefore, in the system configuration in which the Raman amplifier is shared for each transmission section of both the upstream and downstream lines, the supervisory signal indicating particular information can be transferred only in one direction such as only in the upstream direction or only in the downstream direction. In the system in which the upstream line and the downstream line are combined, for example, since supervision is often performed such as by transferring a response signal via the downstream line to the sender side, in response to the supervisory signal transferred via the upstream side from the sender side, it becomes difficult to cope with such supervision.

SUMMARY OF THE INVENTION

The present invention has been accomplished in view of the above problems and has an object to provide an optical transmission system that ensures the reduction of a difference of Raman gain between each of upstream and downstream lines in a system configuration in which Raman amplification is performed for both the upstream and downstream lines by a common Raman amplifier.

In order to achieve the above object, as one aspect of an optical transmission system using Raman amplification according to the present invention, there is provided an optical transmission system which includes an upstream line and a downstream line through which signal light is propagated in directions opposite to each other, for Raman amplifying and transmitting the signal light by supplying pumping light generated in a Raman amplifier common to each line to a plurality of transmission sections set for each of the lines respectively, wherein the plurality of transmission sections of each line comprise a hybrid transmission path configured by connecting a positive dispersion fiber having positive dispersion relative to the signal light and a negative dispersion fiber having negative dispersion relative to the signal light, and at the same time, include transmission sections in which average wavelength dispersion obtained by summing up cumulative wavelength dispersion in the positive dispersion fiber and the negative dispersion fiber is positive, and transmission sections in which the average wavelength dispersion is negative, and when there are points of sign difference where the pumping light generated by the Raman amplifier common to each line is supplied to the transmission section of one line in which the average wavelength dispersion is positive and the transmission section of the other line in which the average wavelength dispersion is negative, the hybrid transmission path used for the transmission sections of each line, which correspond to the points of sign difference, comprises the positive dispersion fiber and the negative dispersion fiber which are set so that a difference of Raman gain occurring between each of the transmission sections is substantially reduced.

In such a configuration, for the upstream line and the downstream line, even when the signal light is Raman amplified by the Raman amplifier common to the transmission sections in which the average wavelength dispersion is opposite to each other in positive/negative sign, the difference of the Raman gain occurring between the transmission sections of each line can be reduced, more preferably, the Raman gain in each line can be substantially equal to each other, and therefore variation of Raman amplification characteristics in each transmission section on the system can also be reduced.

In the above optical transmission system, the hybrid transmission path used for the transmission sections of each line, which correspond to the point of sign difference, may be configured so that the length of each negative dispersion fiber is substantially equal to each other by using the negative dispersion fibers having different wavelength dispersion values. According to such a configuration, since the length of the negative dispersion fibers having a smaller mode field diameter in which the Raman gain would be mainly obtained is substantially equal to each other, the Raman gain of each line can be substantially equal to each other irrespective of positive/negative of the average wavelength dispersion.

Further, in the above optical transmission system, the hybrid transmission path used for the transmission sections of each line, which correspond to the point of sign difference may also be configured, so that the total length of the side in which the average wavelength dispersion is positive, is shorter than the total length of the side in which the average wavelength dispersion is negative. According to such a configuration, the total length of the hybrid transmission path is adjusted, so that the losses occurring in the transmission section having negative wavelength dispersion in which the Raman gain becomes relatively large are increased, and the losses occurring in the transmission section having positive wavelength dispersion in which the Raman gain becomes relatively small are decreased. Thereby it becomes possible to substantially reduce the difference of the Raman gain between each of the transmission sections.

As another aspect of the optical transmission system using Raman amplification according to the present invention, there is provided an optical transmission system which includes an upstream line and a downstream line through which signal light is propagated in directions opposite to each other, for Raman amplifying and transmitting the signal light by supplying pumping light generated in a Raman amplifier common to each line to a plurality of transmission sections set for each of the lines respectively, wherein the Raman amplifier common to each line enables to set individually pumping light power to be supplied to the transmission sections of the upstream line and pumping light power to be supplied to the transmission sections of the downstream line.

According to such a configuration, since the Raman amplifier common to each line can supply the pumping light of different power settings to the transmission sections of the upstream line and to the transmission sections of the downstream line, respectively, even when the average wavelength dispersion of each line is different from each other in positive/negative or even in the case of insertion of an optical fiber and the like at the time of failure, the difference of the Raman gain between each of the transmission sections of each line can be reduced.

As still another aspect of the optical transmission system using Raman amplification according to the present invention, there is provided an optical transmission system comprising a plurality of unitary systems each of which includes an upstream line and a downstream line through which signal light is propagated in directions opposite to each other, for Raman amplifying and transmitting the signal light by supplying pumping light generated by a Raman amplifier common to each unitary system to a plurality of transmission sections set for each of the unitary systems, wherein the Raman amplifier common to each unitary system comprises a first pumping light supplying section common to at least two upstream lines among the upstream lines of each unitary system and a second pumping light supplying section common to at least two downstream lines among the downstream lines of each unitary system.

According to such a configuration, in the Raman amplifier common to each unitary system, at least two upstream lines are pumped by pumping light from the common first pumping light supplying section together, and at least two downstream lines are pumped by pumping light from the common second pumping light supplying section together. Therefore, even when the average wavelength dispersion of each line is different from each other in positive/negative or even in the case of insertion of an optical fiber at the time of failure and the like, the difference of the Raman gain between the upstream lines and the downstream lines in each unitary system can be reduced.

The other objects, features and advantages of the present invention will be apparent from the following description of the embodiments with reference to the accompanying drawings.

DETAILED DESCRIPTION OF THE INVENTION

Figure 1:
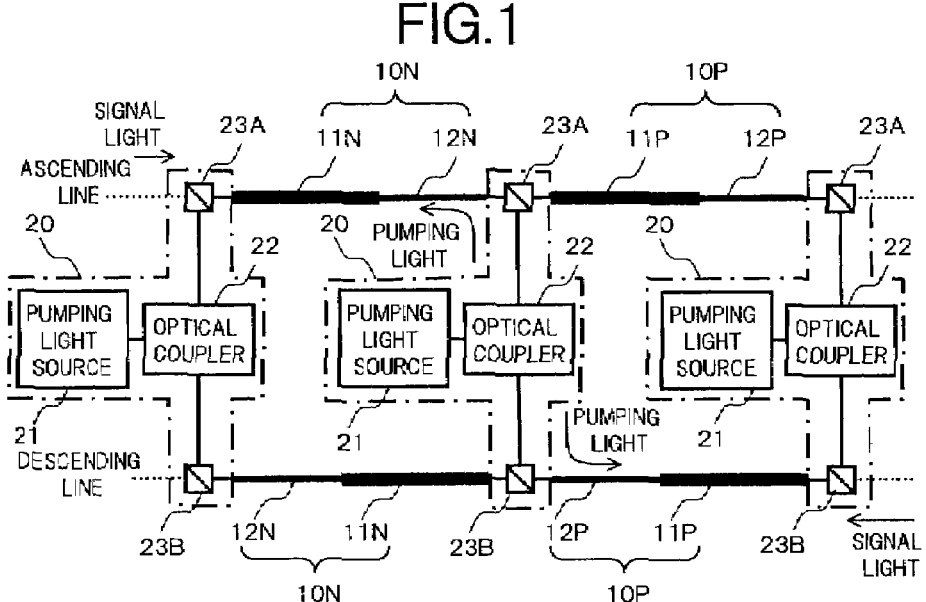
FIG. 1 is a diagram showing an essential part configuration of an optical transmission system according to a first embodiment of the present invention.

Hereinafter, embodiments of the present invention will be described with reference to drawings. Here, in each of the drawings, same components are denoted by same reference numerals, the description thereof will be omitted.

Figure 2:
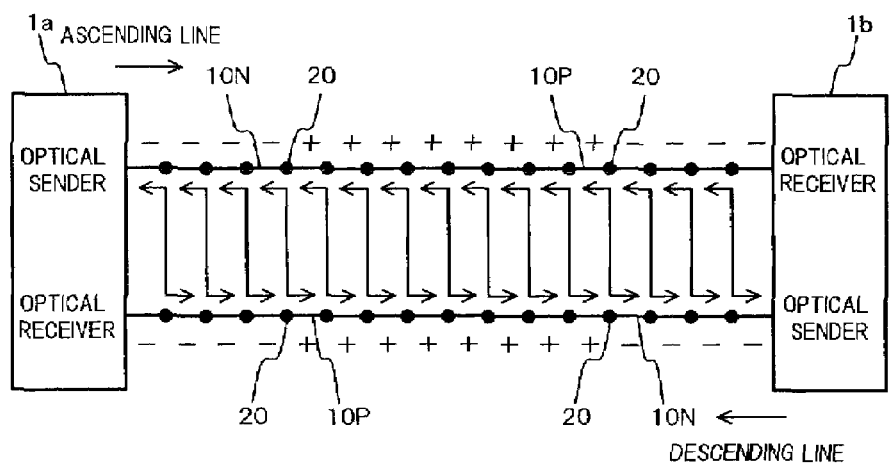
FIG. 2 is a schematic diagram showing an overall configuration of the optical transmission system according to the above first embodiment.

FIG. 1 is a diagram showing an essential part configuration of an optical transmission system according to a first embodiment of the present invention. FIG. 2 is a schematic diagram showing an overall configuration of the optical transmission system according to the first embodiment.

First, in FIG. 2, the present optical transmission system has a basic configuration in which, for example, an upstream line and a downstream line are provided between optical terminal stations 1a and 1b, and a plurality of optical repeater stations 20 each comprising a Raman amplifier that collectively performs distributed Raman amplification for each line are arranged on an optical transmission line at equal intervals. Here, in FIG. 2, one optical repeater station is represented by a pair of black dots marked on the upstream line and the downstream line.

The optical terminal station 1a comprises an optical sender corresponding to the upstream line and an optical receiver corresponding to the downstream line, while the optical terminal station 1b comprises an optical sender corresponding to the downstream line and an optical receiver corresponding to the upstream line. These optical terminal stations 1a and 1b are configured similarly to a known optical terminal station.

Each of the optical terminal stations 1a and 1b and the optical repeater station 20 as well as the adjacent optical repeater stations 20 are interconnected by hybrid transmission paths configured by combining positive dispersion fibers (+D fibers) and negative dispersion fibers (−D fibers), so as to correspond to each of the upstream and downstream lines, respectively. With regard to each transmission section on the upstream and downstream lines, sections using the hybrid transmission path 10P in which average wavelength dispersion for signal light positive (hereinafter referred to as "positive hybrid transmission path") and sections using the hybrid transmission path 10N in which average wavelength dispersion for signal light is negative (hereinafter referred to as the "negative hybrid transmission path") are provided in a required arrangement. In FIG. 2, the transmission section using the positive hybrid transmission path 10P is represented by the sign "+" and the transmission section using the negative hybrid transmission path 10N is represented by the sign "−". Here, the positive and negative hybrid transmission lines are arranged, for example, so that the hybrid transmission paths of same sign are used for the same transmission sections, and cumulative wavelength dispersion in the optical transmission paths between the optical terminal stations 1a and 1b becomes substantially zero. More specifically, in an example in FIG. 2, four transmission sections using the negative hybrid transmission path 10N, eight transmission sections using the positive hybrid transmission path 10P, and further four transmission sections using the negative hybrid transmission path 10N are arranged in succession from the upstream side of the upstream line.

Here, the arrangement of the positive and negative hybrid transmission paths used for each transmission section is not limited to the example shown in FIG. 2, but the transmission paths can be set appropriately according to the configuration of the optical transmission system and the like. Also, although the transmission paths are arranged so that the cumulative wavelength dispersion over the entire system becomes substantially zero in the example in FIG. 2, the transmission paths may be arranged to generate significant cumulative wavelength dispersion, which may be compensated at the optical terminal stations and the like in such a case.

Figure 13:
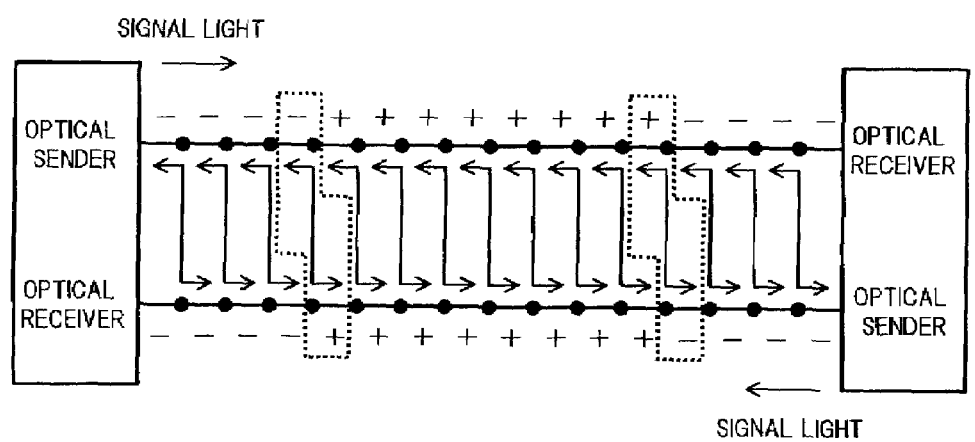
FIG. 13 is a diagram for explaining a drawback of the optical transmission system of FIG. 12.
Figure 14:
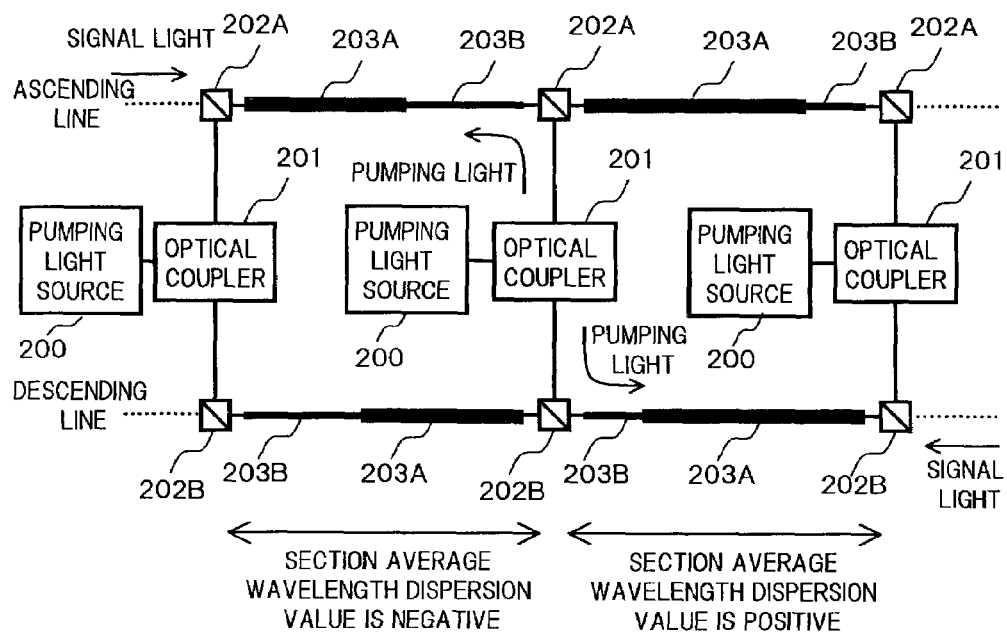
FIG. 14 is an illustrative diagram showing the parts enclosed by dotted lines in FIG. 13 in an enlarged manner.

In such a system configuration in which the distributed Raman amplification is performed collectively for both the upstream and downstream lines in each optical repeater station 20, just as in the case shown above in FIG. 13, there appears portions (points of sign difference) where two types of the transmission sections, in the upstream and downstream lines, in which the average wavelength dispersion opposite to each other in positive/negative sign are pumped by one optical repeater section 20. More specifically, in the example in FIG. 2, the points where fourth and twelfth optical repeater stations 20 from the upstream side of the upstream line are arranged, correspond to the points of sign difference described above.

The optical transmission system according to the first embodiment is characterized in that a difference of Raman gain among each of the transmission sections having average wavelength dispersion opposite to each other in negative/positive is reduced by improving each hybrid transmission path connected to the optical repeater stations 20 at the points of sign difference as described above. Here, the above characteristic is described in detail with reference to an enlarged block diagram of the configuration in the vicinity of the fourth optical repeater station 20 shown in FIG. 1. Here, the improvement of the hybrid transmission path connected to the twelfth optical repeater station 20 can be considered similarly to the case of the fourth optical repeater station 20 and therefore the description thereof is omitted herein.

In FIG. 1, a configuration enclosed in an alternate long and short dashed line shown in the center of the figure corresponds to the Raman amplifier provided in the fourth optical repeater station 20, wherein, with regard to the upstream line, the optical repeater station 20 at the point of sign difference is connected to the negative hybrid transmission path 10N used for the transmission sections at the upstream side (the left side in the figure) and to the positive hybrid transmission path 10P used for the transmission sections at the downstream side (the right side in the figure), and on the other hand, with regard to the downstream side, it is connected to the positive hybrid transmission path 10P used for the transmission sections at the upstream side (right side in the figure) and to the negative transmission path 10N used for the transmission sections at the downstream side (left side in the figure).

As a specific configuration, the Raman amplifier in the optical repeater station 20 includes, for example, a pumping light source 21 generating pumping light for Raman amplification, an optical coupler 22 branching the pumping light generated by the pumping light source 21 into the upstream line and the downstream line, a multiplexer 23A providing one pumping light branched by the optical coupler 22 to the upstream line, and a multiplexer 23B providing the other pumping light to the downstream line.

The pumping light source 21 is a known light source that generates pumping light of required power that has a wavelength set according to a wavelength band of signal light transmitted on each line. As the pumping light source 21, a single wavelength light source that generates pumping light of a specific wavelength or a multi-wavelength light source that generates a plurality of pumping light having wavelengths different from each other may be used.

The optical coupler 22 is a typical branch coupler that branches the pumping light output from the pumping light source 21 at a predetermined ratio (for example, 1:1).

The multiplexer 23A at the upstream side provides the one pumping light output from the optical coupler 22 to the negative hybrid transmission path 10N connected to the upstream side so that the pumping light is propagated in a direction opposite to that of signal light, and, at the same time, transmits the signal light propagated through the negative hybrid transmission path 10N at the upstream side to the positive hybrid transmission path 10P at the downstream side.

The multiplexer 23B at the downstream side provides the other pumping light output from the optical coupler 22 to the positive hybrid transmission path 10P connected to the upstream side so that the pumping light is propagate in a direction opposite to that of signal light, and, at the same time, transmits the signal light propagated through the positive hybrid transmission path 10P at the upstream side to the negative hybrid transmission path 10N at the downstream side.

The positive hybrid transmission path 10P of each line comprises a +D fiber 11P and a −D fiber 12P. The +D fiber 11P has positive wavelength dispersion relative to the signal light and desirably, has a positive dispersion slope. The −D fiber 12P has negative wavelength dispersion relative to the signal light and desirably, has a negative dispersion slope. The −D fiber 12P has a mode field diameter smaller than that of the +D fiber 11P. Further, the negative hybrid transmission path 10N comprises a +D fiber 11N and a −D fiber 12N, similarly to the positive hybrid transmission path 10P. In each of the positive and negative hybrid transmission paths 10P and 10N of each line, the +D fibers 11P and 11N are arranged at the upstream side and the −D fibers 12P and 12N are arranged at the downstream side. Namely, in-each of the hybrid transmission paths 10P and 10N, each signal light transmitted on the upstream line and the downstream line are propagated through the −D fibers 12P and 12N after it has been propagated through the +D fibers 11P and 11N.

Each of the positive and negative hybrid transmission paths 10P and 10N connected to the optical repeater station 20 at the point of sign difference as described above differs from the positive and negative hybrid transmission paths to be applied to the known optical transmission system in that the positive and negative hybrid transmission paths 10P and 10N are set so that lengths of the −D fibers 12P and 12N are made equal to each other. Namely, in the known optical transmission system, in order to set average wavelength dispersion in sections in a hybrid transmission path to a required value, a ratio of length between the +D fiber and the −D fiber has been changed. More specifically, for example, assuming that the wavelength dispersion value of the +D fiber and the −D fiber are +20 ps/nm/km and −45 ps/nm/km, respectively, in order to set the average wavelength dispersion for a transmission section of 50 km to −2.7 ps/nm/km, the length of the +D fiber has been set to 32.5 km and the length of the −D fiber has been set to 17.5 km, or in order to set the average wavelength dispersion for a transmission section of 50 km to +2.7 ps/nm/km, the length of the +D fiber has been set to 36.7 km and the length of the −D fiber has been set to 13.3 km.

On the contrary, in this embodiment, by applying the −D fibers 12P and 12N having different wavelength dispersion values, the average wavelength dispersion is adjusted so that the ratio of length between the +D fiber 11P and the −D fiber 12P constituting the positive hybrid transmission path 10P is made equal to the ratio of length between the +D fiber 11N and the −D fiber 12N constituting the negative hybrid transmission path 10N.

Here, as a specific example, a consideration is made on a case in which the lengths of the +D fibers 11P, 11N and the −D fiber 12P, 12N constituting each of the hybrid transmission paths 10P, 10N are set to 34.6 km and 15.4 km, respectively. In this case, in order to constitute the positive hybrid transmission path 10P having average wavelength dispersion of +2.7 ps/nm/km, the wavelength dispersion values of the +D fiber 11P and the −D fiber 12P may be set to +20 ps/nm/km and −36 ps/nm/km, respectively. Further, in order to constitute the negative hybrid transmission path 10N having average wavelength dispersion of −2.7 ps/nm/km, the wavelength dispersion values of the +D fiber 11N and the −D fiber 12N may be set to +20 ps/nm/km and −54 ps/nm/km, respectively.

Figure 3:
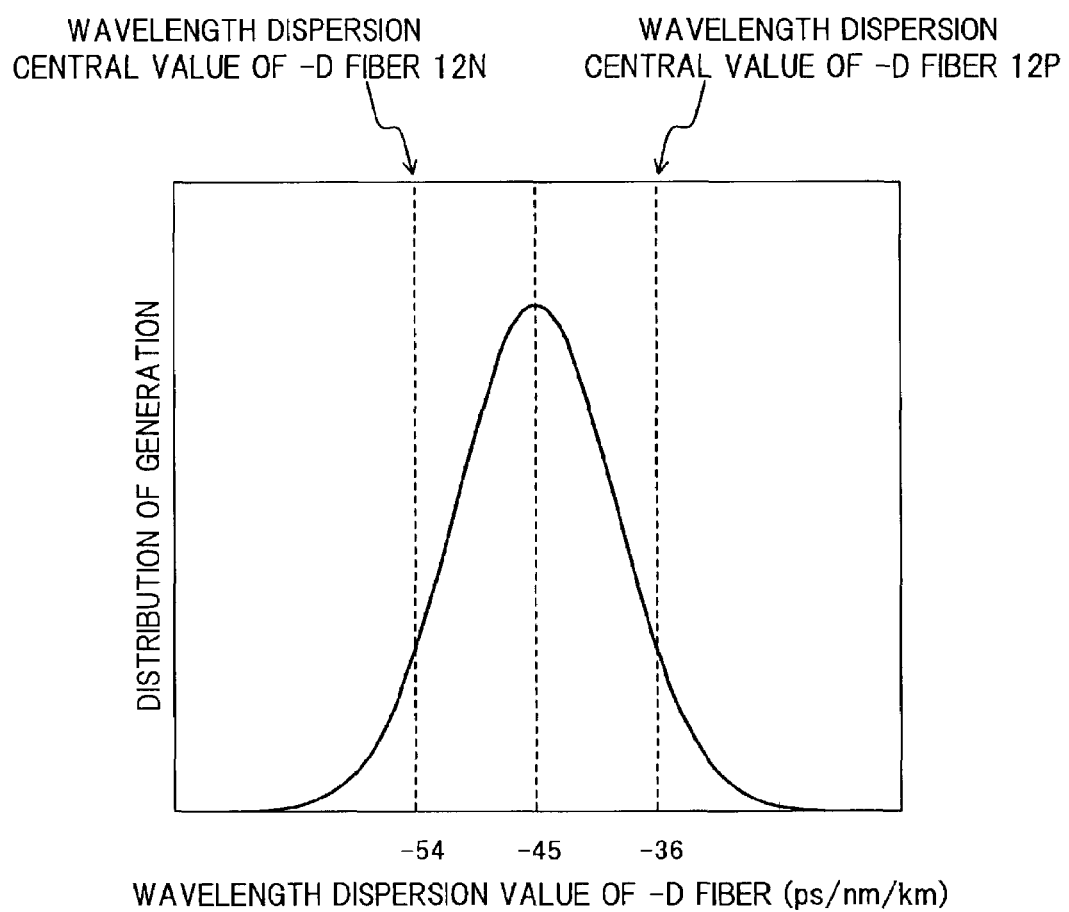
FIG. 3 is a diagram showing generation distribution of wavelength dispersion values with regard to a −D fiber used in the first embodiment.

The −D fibers 12P and 12N having different wavelength dispersion values as described above can be obtained relatively readily by considering generation distribution of the wavelength dispersion values of the −D fibers as shown in FIG. 3, for example. That is, in the case as in the conventional technique in which the ratio of length between the +D fiber and the −D fiber was changed, the −D fiber having a wavelength dispersion value of −45 ps/nm/km corresponding to the vicinity of the peak of the generation distribution shown in FIG. 3 was selected and its length was adjusted. On the other hand, in this embodiment, it is possible that −D fibers that are out of the peak of the generation distribution and that were not utilized for such application conventionally are included in a scope of selection and any −D fiber having the wavelength dispersion value assumed in the above specific example is selected among them to be utilized appropriately.

As described above, in the optical transmission system of the first embodiment, since for the positive and negative hybrid transmission paths 10P and 10N connected to the optical repeater station 20 at the point of sign difference, the average wavelength dispersion can be adjusted by using the −D fibers 12P and 12N having different wavelength dispersion values, the −D fibers 12P and 12N each having a small mode field diameter in which the Raman gain would mainly be obtained have the lengths substantially equal to each other in each transmission section using the positive and negative hybrid transmission paths 10P and 10N. Therefore, even in the system configuration in which the distributed Raman amplification is performed using the Raman amplifier common to the upstream line and the downstream line, the difference of the Raman gain between the upstream line and the downstream line can be reduced. As a consequence, variation of the Raman amplification characteristics in each transmission section on the system can also be reduced and thus, for example, a large-capacity and long-distance wavelength division multiplexing optical transmission system and the like can be realized.

In the above first embodiment, although a case where the positive and negative hybrid transmission paths 10P and 10N, the average wavelength dispersion for the sections of which are adjusted by using the −D fibers 12P and 12N having different wavelength dispersion values, are applied to the transmission section connected to the optical repeater station 20 at the point of sign difference, the hybrid transmission path as described above may also be applied to the other transmission sections connected to the optical repeater stations 20 that are not at the point of sign difference. By applying such hybrid transmission path to all transmission sections in the optical transmission system, a configuration of the optical transmission paths in the entire system can also be simplified.

Figure 4:
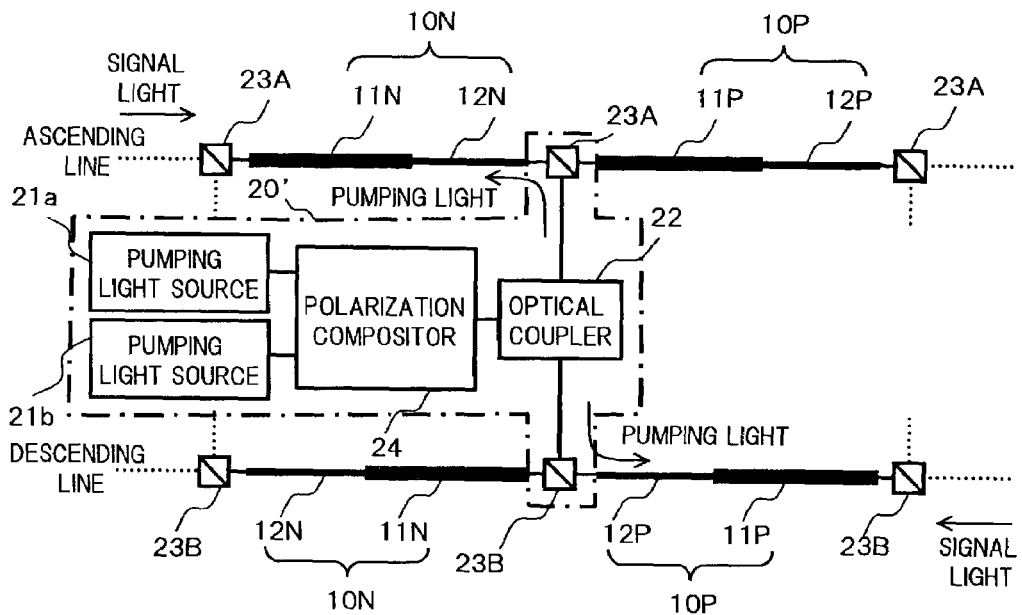
FIG. 4 is a diagram showing another exemplary configuration of an optical repeater station applicable to the first embodiment.
Figure 5:
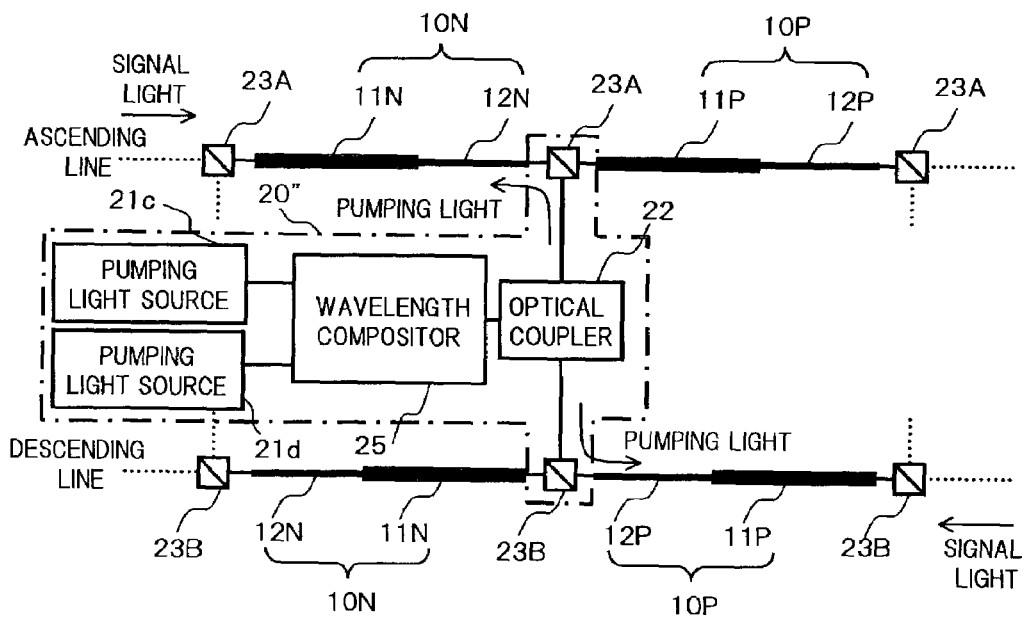
FIG. 5 is a diagram showing still another exemplary configuration of the optical repeater station applicable to the first embodiment.

Also, although the Raman amplifier in each optical repeater station 20 is configured to distribute the pumping light generated by one pumping light source 21 to the upstream line and the downstream line by means of the optical coupler 22 in the first embodiment, it may alternatively be configured to multiplex pumping light generated by a plurality of pumping light sources and then distribute the multiplexed pumping light to each line. More specifically, for example, as shown in FIG. 4, it is possible to multiplex each pumping light generated by pumping light sources 21*a* and 21*b* using a polarization compositor 24 and then branch the multiplexed pumping light using the optical coupler 22 to send it to the multiplexers 23A and 23B, respectively. Further, for example, as shown in FIG. 5, pumping light having different wavelengths generated by pumping light sources 21c and 21d may be multiplexed using a wavelength compositor 25.

Next, an optical transmission system according to a second embodiment of the present invention will be described.

The second embodiment is a variation of the optical transmission system of the first embodiment described above. More specifically, in the optical transmission system of the first embodiment, the consideration was made on a system configuration in which each optical repeater station 20 was arranged at equal intervals between the optical terminal stations 1a and 1b and all transmission sections are set to have the same distance (for example, 50 km). In contrast to this, in the optical transmission system of the second embodiment, a system configuration in which the distance between each of the transmission sections can be set arbitrarily will be considered.

Figure 6:
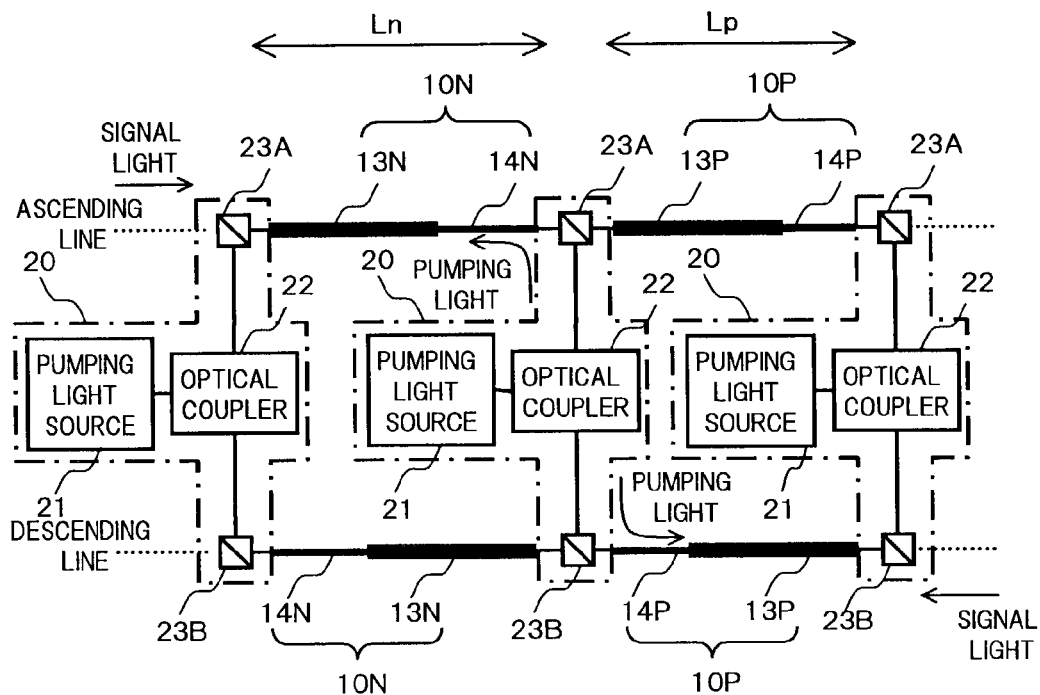
FIG. 6 is a diagram showing an essential part configuration of an optical transmission system according to a second embodiment of the present invention.

FIG. 6 is a diagram showing an essential part configuration of the optical transmission system according to the second embodiment. Here, the overall configuration of this optical transmission system is similar to the case shown in FIG. 2 above, wherein an enlarged construction in the vicinity of the fourth optical repeater station 20 from the upstream side of the upstream line is shown in FIG. 6, just as in the case of FIG. 1 above.

The essential part configuration shown in FIG. 6 is characterized in that desired distributed Raman amplification for both the upstream line and the downstream line is realized using one common Raman amplifier by adjusting entire lengths Lp and Ln of the respective positive and negative hybrid transmission paths 10P and 10N connected to the optical repeater station 20 at the point of sign difference positioned centrally, while the −D fibers 12p and 12n having the same wavelength dispersion value and different lengths can be used.

For the distributed Raman amplification for each line realized by the optical repeater station 20 at the point of sign difference, basically, the Raman gain generated in each transmission section may be substantially equal to transmission path losses and pumping light multiplexing system losses in the corresponding transmission section. When the upstream line and the downstream line are pumped by the common Raman amplifier, if the −D fibers 12p and 12n constituting the positive and negative hybrid transmission paths 10P and 10N have lengths different from each other, a difference of the Raman gain is caused between each of hybrid transmission path 10P and 10N. But, if the distances of the transmission sections (the entire lengths of each of the hybrid transmission path Lp and Ln) are set so that the transmission path losses and the pumping light multiplexing system losses in each of the transmission sections become substantially equal to the Raman gain, the gain difference of the distributed Raman amplification for each line can substantially be reduced.

Specifically, a consideration is made on a case where the wavelength dispersion values of the +D fibers 11p, 11n and the −D fibers 12p, 12n constituting the positive and negative hybrid transmission paths 10P and 10N shown in FIG. 6 are assumed to be, for example, +20 ps/nm/km and −45 ps/nm/km, respectively. In this case, for example, assuming that the entire length Ln of the hybrid transmission path 10N used for the negative transmission section is 50 km, in order to obtain the average wavelength dispersion for the sections of −2.7 ps/nm/km, the lengths of the +D fiber 11n and the −D fiber 12n may be set to 36.7 km and 13.3 km, respectively. Since the pumping light power necessary for the distributed Raman amplification for compensating for the losses in the transmission section using the negative hybrid transmission path 10N is determined to be a required value, by using the pumping light having the same power, the entire length Lp of the hybrid transmission path 10P to realize the Raman gain necessary for the positive transmission section having average wavelength dispersion of +2.7 ps/nm/km can be obtained. In particular, in the above setting condition, assuming that the +D fiber 11p and the −D fiber 12p of the positive hybrid transmission path 10P are 33.8 km and 12.2 km, respectively, the entire length Lp of the hybrid transmission path 10P may be set to 46 km.

As described above, in the optical transmission system of the second embodiment, even by adjusting the entire lengths Lp and Ln of the positive and negative hybrid transmission paths 10P and 10N connected to the optical repeater station 20 at the point of sign difference, the effects substantially equal to the case of the first embodiment described above can also be obtained.

Here, although the −D fibers 12p and 12n having the same wavelength dispersion value are used in the above second embodiment, the combination of the first embodiment and the second embodiment described above can also be contemplated, wherein the distributed Raman amplification in each of the transmission sections in which the average wavelength dispersion is different from each other in positive/negative, may be optimized by adjusting the distances of the transmission sections while using the −D fibers having different wavelength dispersion values.

Further, although the optical repeater station 20 is configured to distribute the pumping light generated in one pumping light source 21 to both the upstream line and the downstream line also in the second embodiment, just as in the case illustrated in FIGS. 4 and 5 above, it may alternatively be configured to multiplex the pumping light generated by a plurality of pumping light sources and then distribute to each line.

Next, an optical transmission system according to a third embodiment will be described.

Figure 7:
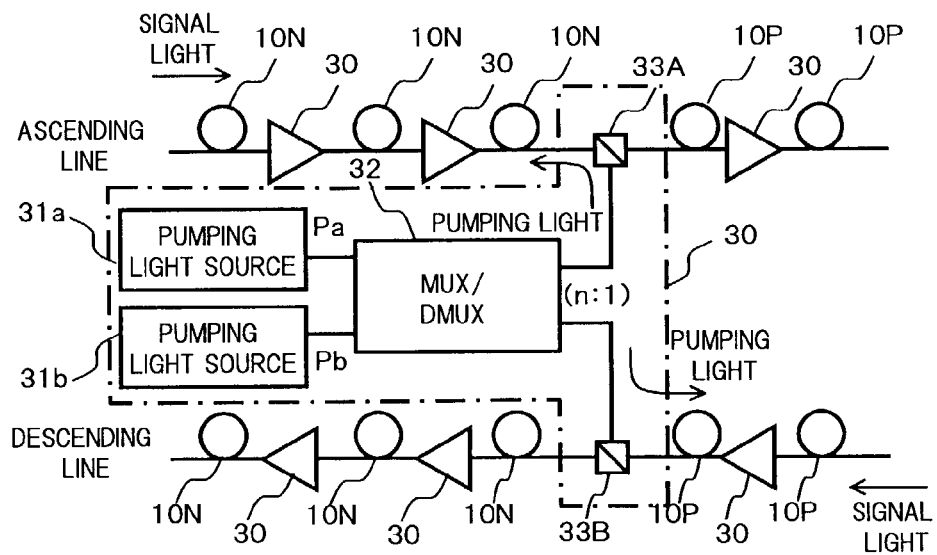
FIG. 7 is a diagram showing an essential part configuration of an optical transmission system according to a third embodiment of the present invention.

FIG. 7 is a diagram showing an essential part configuration of the optical transmission system of the third embodiment.

In FIG. 7, this optical transmission system has a basic configuration in which an upstream line and a downstream line are provided between optical terminal stations (not shown) and a plurality of optical repeater stations 30 each comprising a Raman amplifier to perform collectively distributed Raman amplification for each line are arranged on an optical transmission path at regular intervals. Here, in FIG. 7, an exemplary specific configuration of Raman amplifier for one of the plurality of optical repeater stations 30 is represented in a portion enclosed by long and short dashed lines and each of the other optical repeater stations 30 are represented by a pair of triangles drawn on the upstream line and the downstream line.

The optical transmission path 10 connects the adjacent optical repeater stations 30, so as to correspond to the upstream line and the downstream line, respectively. It is preferable that the optical transmission path 10 used for each transmission section is the hybrid transmission path in which +D fiber and −D fiber are combined, but it may also comprise a typical optical fiber transmission path.

The Raman amplifier provided in each optical repeater station 30 includes, for example, two pumping light sources 31a and 31b each generating pumping light for Raman amplification, a multiplexer/demultiplexer 32 distributing the pumping light generated by each of the pumping light sources 31a and 31b to the upstream line and the downstream line, a multiplexer 33A providing one pumping light demultiplexed by the multiplexer/demultiplexer 32 to the upstream line, and a multiplexer 33B providing the other pumping light to the downstream line.

Each of the pumping light sources 31a and 31b is a known light source that generates pumping light having a wavelength set according to a wavelength band of signal light transmitted on each line. The power of each pumping light generated by each of the pumping light sources 31a and 31b can be set individually, wherein the power of the pumping light generated by the pumping light source 31a is denoted by Pa and the power of the pumping light generated by the pumping light source 31b is denoted by Pb.

The multiplexer/demultiplexer 32 multiplexes each pumping light output from each of the pumping light sources 31a and 31b, and then branches the pumping light at a predetermined power ratio of n:1 (n≠1) to output the branched pumping light to each of the multiplexers 33A and 33B, respectively.

Each of the multiplexers 33A and 33B provides the pumping light output from the multiplexer/demultiplexer 32 to the optical transmission path 10 connected at the upstream side so that the pumping light is propagated in a direction opposite to that of signal light, and, at the same time, transmits the signal light propagated through the optical transmission path 10 at the upstream side to the optical transmission path 10 at the downstream side.

In each optical repeater station 30 having the configuration as described above, pumping light having the power Pa output from the pumping light source 31a and pumping light having the power Pb output from the pumping light source 31b are multiplexed by the multiplexer/demultiplexer 32, then branched at the ratio of n:1, to be sent to each of the multiplexers 33A and 33B. At this time, the power of the pumping light sent from the multiplexer/demultiplexer 32 to the multiplexer 33A at the upstream line side is Pa×n+Pb, while the power of the pumping light sent from the multiplexer/demultiplexer 32 to the multiplexer 33B at the downstream line side is Pa+Pb×n. Therefore, by adjusting the power of each pumping light output from each of the pumping light sources 31a and 31b appropriately, the power of the pumping light supplied to the optical transmission path 10 at the upstream line side and the power of the pumping light supplied to the optical transmission path 10 at the downstream line side can be set independently.

As a result, for example, in a system configuration in which a hybrid transmission path configured by combining the +D fiber and the −D fiber is used as the optical transmission paths of the upstream line and the downstream line and the transmission sections in which the average wavelength dispersion is positive and the transmission sections in which the average wavelength dispersion is negative are arranged appropriately, at the optical repeater station 30 at the point of sign difference where the pumping light is supplied to two types of transmission sections, in the upstream line and the downstream line, in which the average wavelength dispersion are opposite to each other in positive/negative, the pumping light having different power setting is provided to the hybrid transmission path in each line by the Raman amplifier common to each line. Therefore, even when the positive hybrid transmission path and the negative hybrid transmission path have the −D fibers of different lengths as in the prior art, the Raman gain generated in each of the hybrid transmission paths can be made substantially equal to each other by adjusting each power of the pumping light supplied to each line according to the difference of its length.

Figure 15:
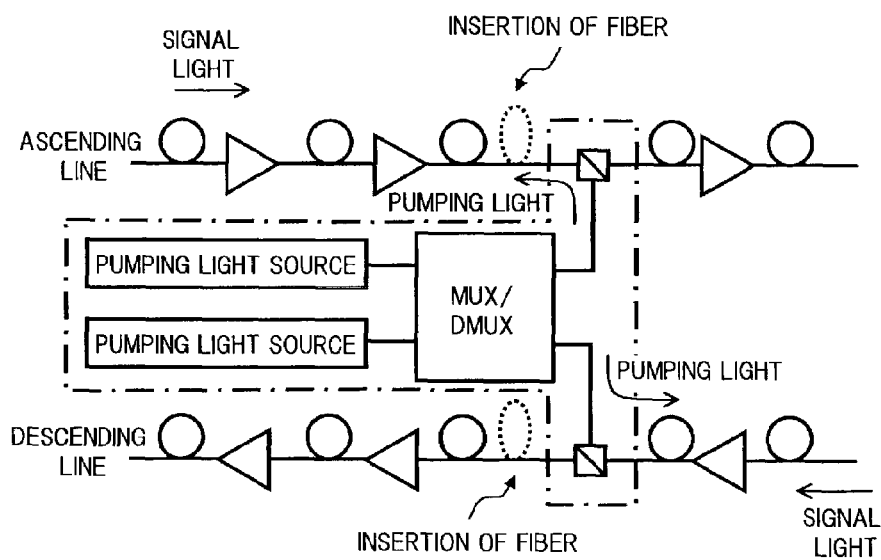
FIG. 15 is a diagram for explaining a problem at the time of failure-and the like in the conventional system configuration.

Further, not only in the case where the hybrid transmission path is used as the optical transmission path 10 but also in the case where a typical optical fiber transmission path is used, at the time of failure and the like as shown in FIG. 15 above, the power of the pumping light supplied to the transmission sections can be adjusted for each line according to whether optical fiber for repair is inserted into the corresponding transmission section or not, and therefore the difference of the Raman gain between the upstream line and the downstream line can be reduced.

Still further, in the third embodiment, although the power of each pumping light supplied to each of the upstream line and the downstream line is controlled independently by setting individually the power of the pumping light Pa and Pb generated by each of the pumping light sources 31a and 31b, respectively, the present invention is not limited to such a configuration and, for example, the configuration may be such that the pumping light generated by the pumping light sources is distributed to each line by using a known device capable of adjusting a power branching ratio as the multiplexer/demultiplexer 32, and the power of each pumping light is controlled independently. In this case, it is also possible to distribute the pumping light generated by one pumping light source to each line by means of a demultiplexer in which the power branching ratio can be varied.

Next, an optical transmission system according to a fourth embodiment of the present invention will be described.

Figure 8:
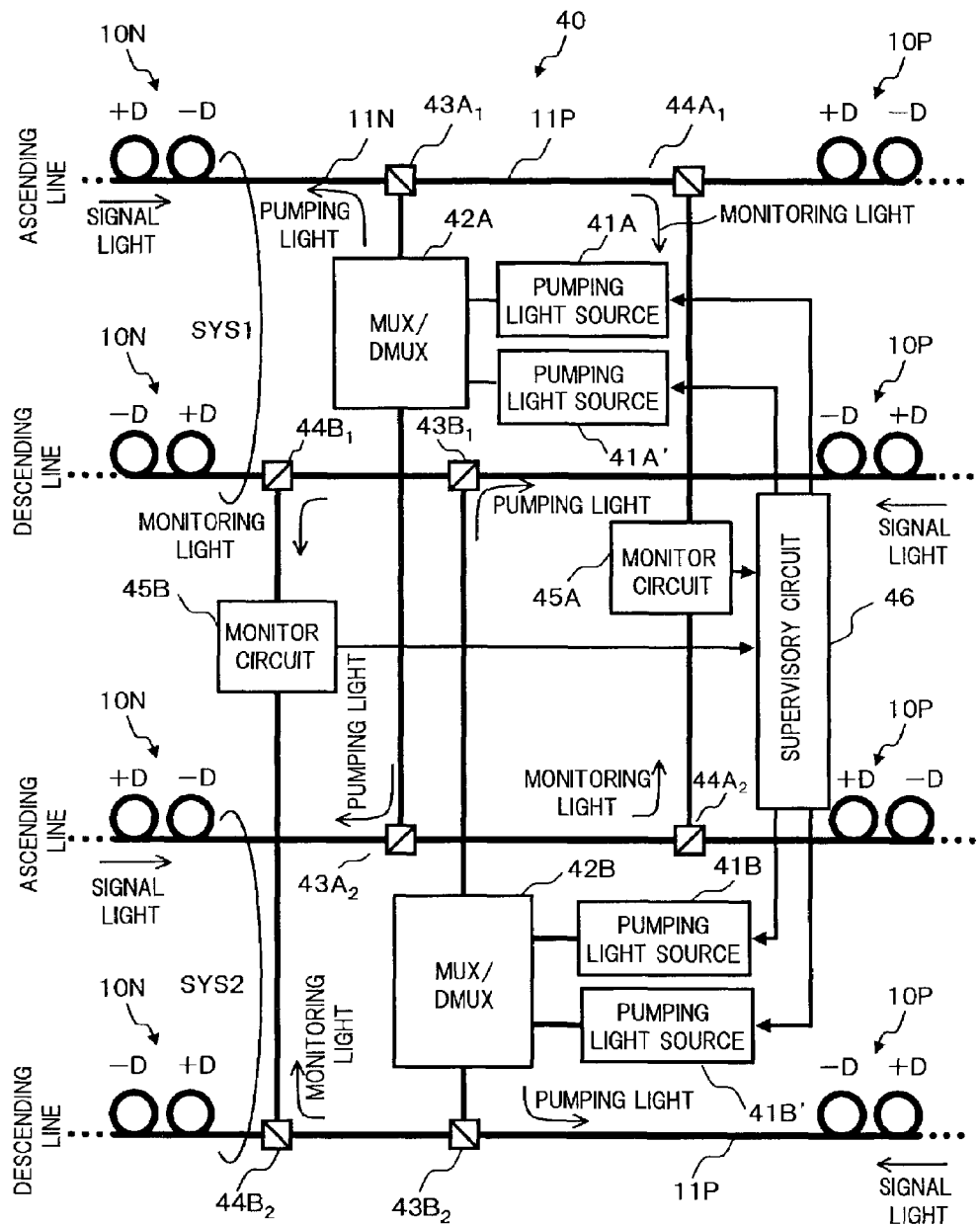
FIG. 8 is a diagram showing an essential part configuration of an optical transmission system according to a fourth embodiment of the present invention.
Figure 9:
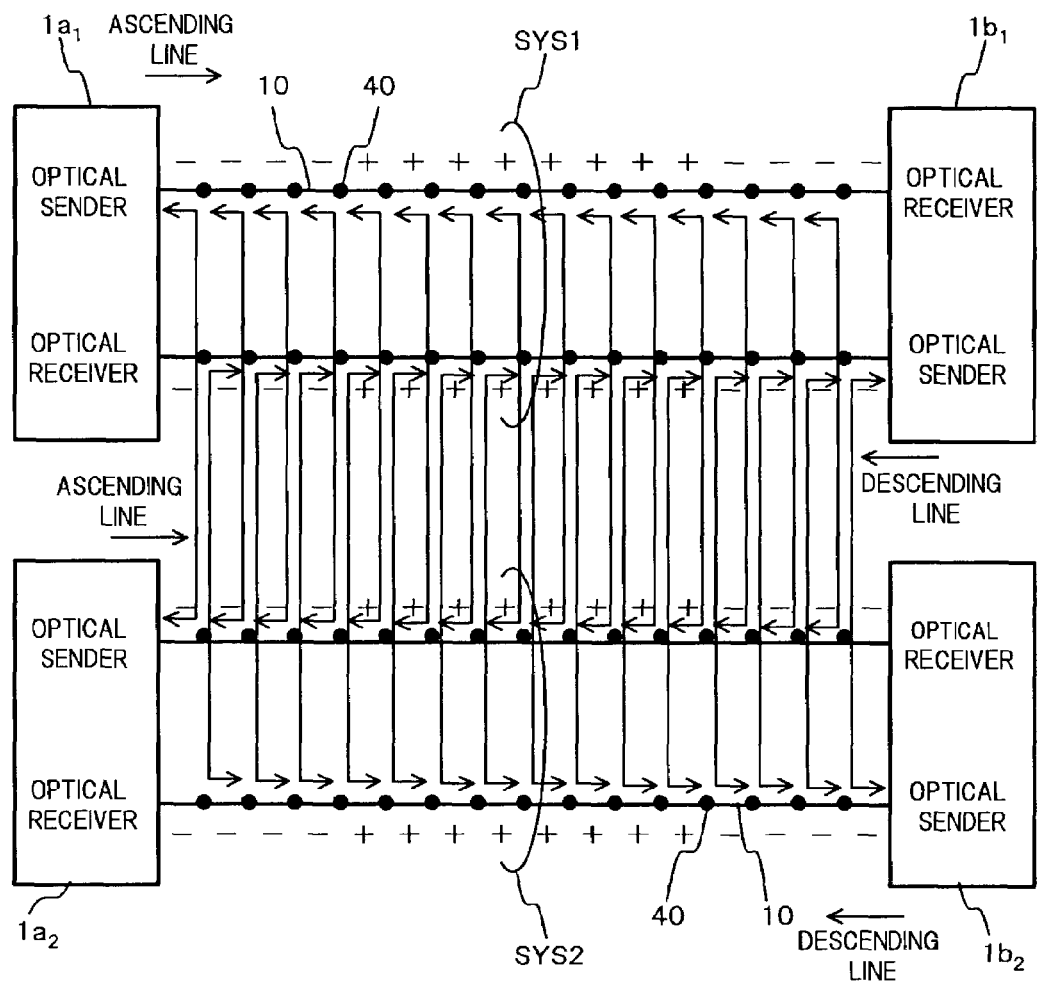
FIG. 9 is a schematic diagram showing an overall configuration of the optical transmission system according to the fourth embodiment.

FIG. 8 is a diagram showing an essential part configuration of the optical transmission system of the fourth embodiment. FIG. 9 is a schematic diagram showing an entire configuration of the optical transmission system of the fourth embodiment.

First, in FIG. 9, this optical transmission system is provided with a basic configuration wherein a unitary system SYS1 in which an upstream line and an downstream line are provided between optical terminal stations $1a_1$ and $1b_1$ are combined with a unitary system SYS2 in which an upstream line and an downstream line are provided between optical terminal stations $1a_2$ and $1b_2$, and a plurality of optical repeater stations 40 are arranged, each of which comprises a Raman amplifier performing collectively distributed Raman amplification for each of upstream and downstream lines of both unitary system SYS1 and SYS2. Here, in FIG. 9, one optical repeater station 40 is represented by a pair of black dots marked on each of upstream and downstream lines of the unitary systems SYS1 and SYS2.

Each of the optical terminal stations $1a_1$, $1b_1$, $1a_2$ and $1b_2$ and the optical repeater stations 40 as well as the adjacent optical repeater stations 40 are interconnected, for example, by hybrid transmission paths in which +D fibers and −D fibers are combined, so as to correspond to each of the upstream and downstream lines, respectively. For each of the unitary systems SYS1 and SYS2, the positive transmission paths 10P and the negative transmission paths 10N to be used in each transmission section are arranged in a manner similar to the case shown in FIG. 2 above, and therefore its description is omitted herein.

As shown in FIG. 8, as a first pumping light supplying section common to each upstream line of the unitary systems SYS1 and SYS2, for example, the Raman amplifier in each of the optical repeater stations 40 includes pumping light sources 41A and 41A', a multiplexer/demultiplexer 42A, and multiplexers $43A_1$ and $43A_2$. Also, as a second pumping light supplying section common to each downstream line of the unitary systems SYS1 and SYS2, the Raman amplifier includes pumping light sources 41B and 41B', a multiplexer/demultiplexer 42B, and multiplexers $43B_1$ and $43B_2$. Further, as a supervisory device common to the unitary systems SYS1 and SYS2, the Raman amplifier includes demultiplexers $44A_1$, $44B_1$, $44A_2$ and $44B_2$, monitor circuits 45A and 45B, and a supervisory circuit 46.

Each of the pumping light sources 41A, 41A', 41B and 41B' is a known light source that generates pumping light of required power that has a wavelength set according to a wavelength band of signal light transmitted on each line of the unitary systems SYS1 and SYS2, for which a single wavelength light source that generates pumping light of a specific wavelength or a multi-wavelength light source that generates a plurality of pumping light having wavelengths different from each other may be used.

The multiplexer/demultiplexer 42A multiplexes the pumping light generated by each of the pumping light sources 41A and 41A' and then branches the pumping light at a predetermined ratio (for example, 1:1) and distributes it to each upstream line of the unitary systems SYS1 and SYS2. On the other hand, the multiplexer/demultiplexer 42B multiplexes the pumping light generated by each of the pumping light sources 41B and 41B' and then branches the pumping light at a predetermined ratio (for example, 1:1) and distributes it to each downstream line of the unitary systems SYS1 and SYS2.

The multiplexers $43A_1$ and $43A_2$ provide the pumping light output from the multiplexer/demultiplexer 42A to the hybrid transmission path 10 connected at the upstream side of each upstream line for the unitary systems SYS1 and SYS2 so that the pumping light is propagated in a direction opposite to that of signal light, and, at the same time, transmit the signal light propagated through the hybrid transmission path 10 at the upstream side to the hybrid transmission path 10 at the downstream side. The multiplexers $43B_1$ and $43B_2$ provide the pumping light output from the multiplexer/demultiplexer 42B to the hybrid transmission path 10 connected at the upstream side of each downstream line for the unitary systems SYS1 and SYS2 so that the pumping light is propagated in a direction opposite to that of signal light, and, at the same time, transmit the signal light propagated through the hybrid transmission path 10 at the upstream side to the hybrid transmission path 10 at the downstream side.

The demultiplexers $44A_1$ and $44A_2$ branch a part of the signal light transmitted through the multiplexers $43A_1$ and $43A_2$ at each upstream line side and send it to the monitor circuit 45A as monitoring light. The demultiplexers $44B_1$ and $44B_2$ branch a part of the signal light transmitted through the multiplexers $43B_1$ and $43B_2$ at the side of each downstream line side and send it to the monitor circuit 45B as monitoring light.

The monitor circuit 45A detects a supervisory signal corresponding to each upstream line of the unitary systems SYS1 and SYS2 based upon a monitoring light sent from each of the demultiplexers $44A_1$ and $44A_2$ and transfers the detection result to the supervisory circuit 46. The monitor circuit 45B detects a supervisory signal corresponding to each downstream line of the unitary systems SYS1 and SYS2 based upon the monitoring light sent from each of the demultiplexers $44B_1$ and $44B_2$ and transfers the detection result to the supervisory circuit 46.

The supervisory circuit 46 controls an operation of each of the pumping light sources 41A, 41A', 41B and 41B' based upon the supervisory signals detected at the monitor circuits 45A and 45B, so that the distributed Raman amplification can be realized according to transmission conditions of the signal light on each line of the unitary systems SYS1 and SYS2, and, at the same time, the pumping light generated by each pumping light source can be modulated according to the supervisory signals to be transferred to the other optical repeater station 40 or the optical terminal station.

In the optical transmission system configured as described above, in each optical repeater station 40, the upstream lines of both of the unitary systems SYS1 and SYS2 are pumped by one common pumping system while the downstream lines are pumped by one common pumping system. Therefore, even in the optical repeater station 40 at the point of sign difference where the pumping light is supplied to two types of transmission sections, in the upstream line and the downstream line, in which the average wavelength dispersion is opposite to each other in positive/negative, the difference of the Raman gain between the upstream line and the downstream line of each of the unitary systems SYS1 and SYS2 can be reduced.

Further, by providing the supervisory device common to each line of the unitary systems SYS1 and SYS2, the supervisory signal can be transferred to both upstream and downstream directions. As a result, for example, a supervisory operation such as for transferring a response signal via the downstream line to the side of the optical terminal station $1a_1$ of the unitary system SYS1, in response to the supervisory signal transferred via the upstream line from the side of the optical terminal station $1a_1$, can readily be realized.

Here, in the fourth embodiment described above, although a configuration in which two unitary systems SYS1 and SYS2 are combined is shown, the present invention is not limited to such a configuration and of course, three or more unitary systems may alternatively be combined.

Further, although two pumping light sources are used for the pumping system common to each line in the above embodiment, alternatively, the pumping light generated in one pumping light source may be distributed to each unitary system as in the first embodiment described above, or three or more pumping light source may be used.

Figure 10:
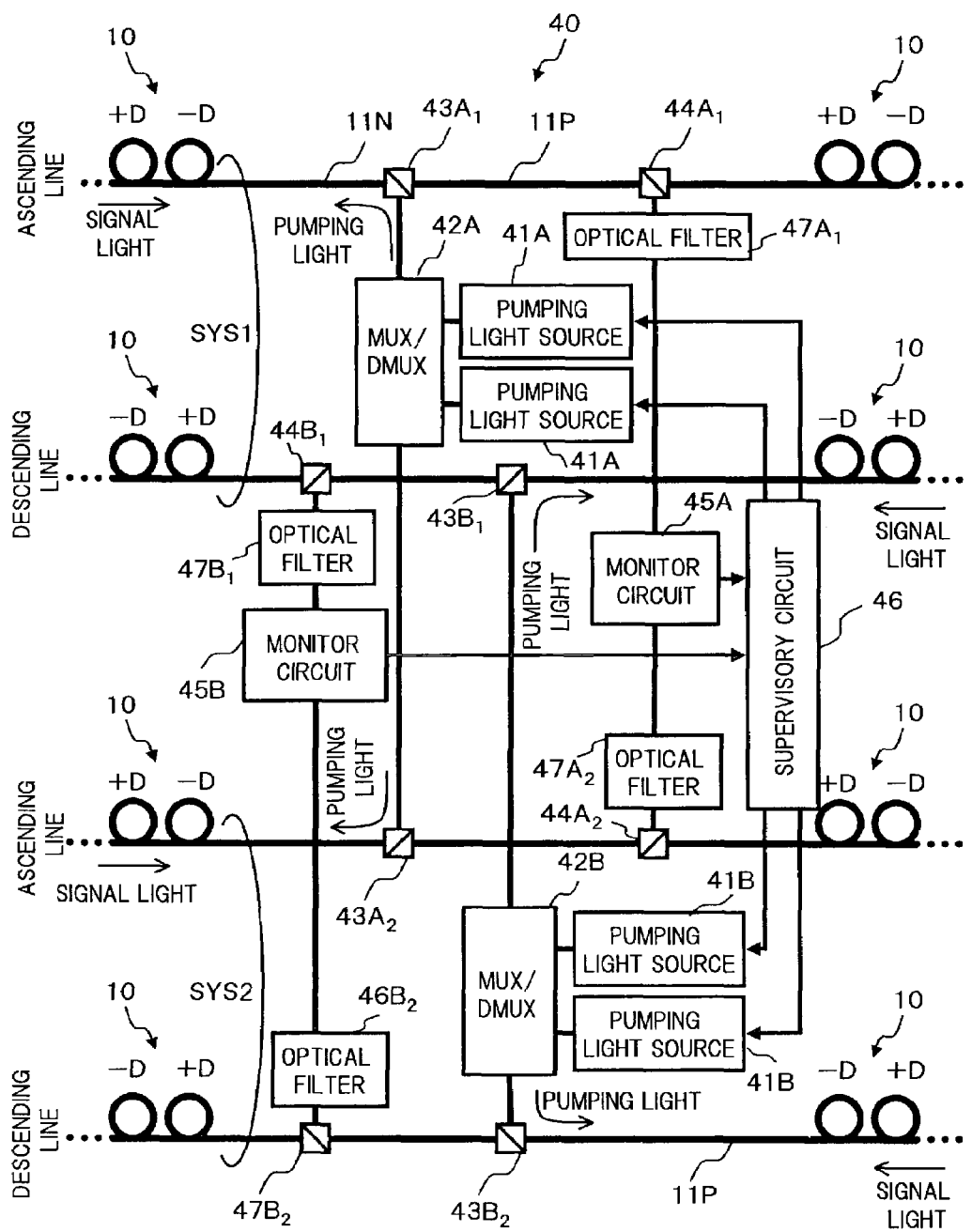
FIG. 10 is a diagram showing another exemplary configuration of the optical repeater station applicable to the fourth embodiment.
Figure 11:
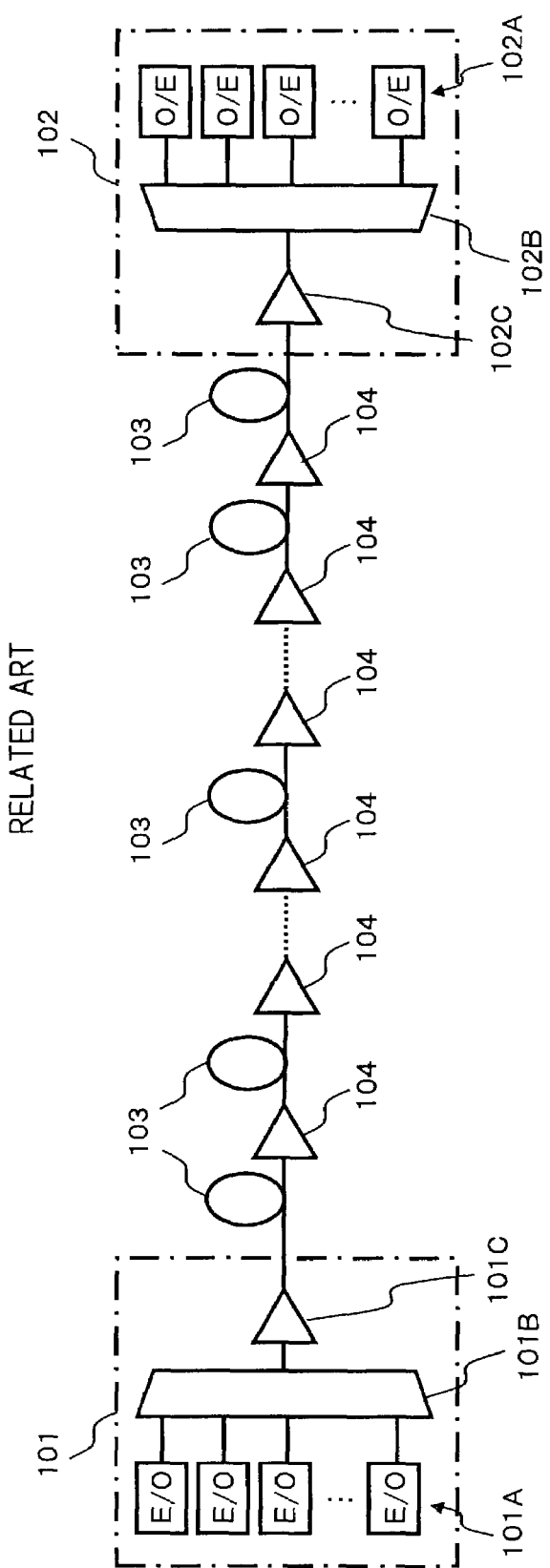
FIG. 11 is a diagram showing an exemplary configuration of a typical WDM optical amplifying-and-repeating transmission system.
Figure 12:
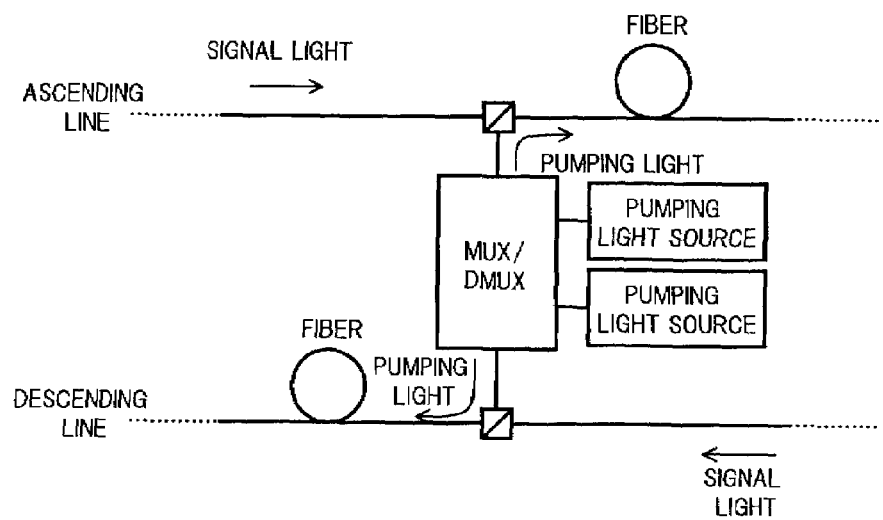
FIG. 12 is a diagram showing an exemplary configuration of the optical transmission system according to the prior invention.

Still further, although the supervisory signal is transferred by modulating the pumping light generated by each pumping light source in the above embodiment, alternatively, in each Raman amplifier, the pumping light generated by one of the pumping light sources (preferably, the pumping light source at the long wavelength side) is modulated for such purpose. In this case, it is preferable that optical filters $47A_1$, $47A_2$, $47B_1$ and $47B_2$ each having a transmission band in the vicinity of the Raman gain peak wavelength caused by the modulated pumping light are connected to branch ports of the multiplexers $46A_1$, $46A_2$, $46B_1$ and $46B_2$ as shown in FIG. 10, for example, to extract the signal light components on which the supervisory signal is superimposed as the monitoring light and transfer the monitoring light to each of the monitor circuits 45A and 45B. By superimposing the supervisory signal on a part of the wavelength band of the signal light as described above, the degradation of the transmission characteristics of the signal light due to an influence of the supervisory signal can be alleviated, and also, by providing the optical filters $47A_1$, $47A_2$, $47B_1$, and $47B_2$ as described above, the supervisory operation with high accuracy can be performed.

What is claimed is:

1. An optical transmission system which includes an upstream line and a downstream line through which signal light is propagated in directions opposite to each other, for Roman amplifying and transmitting the signal light by supplying pumping light generated in a pumping light source common to each line to a plurality of transmission sections set for each of said lines respectively, wherein said plurality of transmission sections of each line comprise a hybrid transmission path configured by connecting a positive dispersion fiber having positive dispersion relative to the signal light and a negative dispersion fiber having negative dispersion relative to the signal light, and at the same time, include transmission sections in which average wavelength dispersion obtained by summing up cumulative wavelength dispersion in said positive dispersion fiber and said negative dispersion fiber is positive, and transmission sections in which the average wavelength dispersion is negative, and when there are points of sign difference where the pumping light generated by the pumping light source common to each line is supplied to the transmission section of one line in which the average wavelength dispersion is positive and the transmission section of the other line in which the average wavelength dispersion is negative, the hybrid transmission path used for the transmission sections of each line, which correspond to said points of sign difference, has a configuration such that said positive dispersion fiber and said negative dispersion fiber which constitute each line are set so that a difference of Raman gain occurring between each of the transmission sections is substantially reduced.

2. An optical transmission system using Raman amplification according to claim 1, wherein the hybrid transmission path used for the transmission sections of each line, which correspond to said points of sign difference is configured so that the length of each negative dispersion fiber is substantially equal to each other by using the negative dispersion fibers having different wavelength dispersion values.

3. An optical transmission system using Raman amplification according to claim 2, wherein the hybrid transmission path used for the transmission sections of each line, which correspond to said points of sign difference is configured so that a wavelength dispersion value of the negative dispersion fiber used in the transmission section in which the average wavelength dispersion is negative is smaller than a wavelength dispersion value of the negative dispersion fiber used in the transmission section in which the average wavelength dispersion is positive.

4. An optical transmission system using Raman amplification according to claim 3, wherein the hybrid transmission path used for the transmission sections of each line, which correspond to said points of sign difference is configured so that the negative dispersion fiber used for the transmission section in which the average wavelength dispersion is negative has a smaller wavelength dispersion value and the negative dispersion fiber used for the transmission section in which the average wavelength dispersion is positive has a larger wavelength dispersion value, relative to the central value of generation distribution with regard to the wavelength dispersion value of the negative dispersion fiber.

5. An optical transmission system using Raman amplification according to claim 1, wherein the hybrid transmission path used for the transmission sections of each line, which correspond to said points of sign difference is also used for the transmission sections of each line, which correspond to points other than said points of sign difference.

6. An optical transmission system which includes an upstream line and a downstream line through which signal light is propagated in directions opposite to each other, for Raman amplifying and transmitting the signal light by supplying pumping light generated in an optical repeater common to each line to a plurality of transmission sections set for each of said lines respectively, wherein the optical repeater common to each line comprises, a first pumping light source and a second pumping light source which provide the capability of individually setting power of generated pumping light in accordance with a difference of Raman gain occurring between the transmission sections of each line, and a multiplexer/demultiplexer which multiplexes pumping light having power Pa generated in said first pumping light source with pumping light having power Pb generated in said second pumping light source, and branches the multiplexed pumping light at a power ratio of n:1 in two ways to thereby supply pumping light having power (Pa×n+Pb) to the transmission section of the upstream line and to thereby supply pumping light having power (Pa+Pb×n) to the transmission section of the downstream line.

7. An optical transmission system comprising a plurality of unitary systems each of which has, as one group, a pair of an upstream line and a downstream line which is provided between optical terminal stations and through which signal light is propagated in directions opposite to each other, for Raman amplifying and transmitting the signal light by supplying pumping light generated by an optical repeater common to each unitary system to a plurality of transmission sections set for each of the unitary systems, wherein the optical repeater common to each unitary system comprises a first pumping light supplying section common to at least two upstream lines among the upstream lines of each unitary system and a second pumping light supplying section common to at least two downstream lines among the downstream lines of each unitary system.

8. An optical transmission system using Raman amplification according to claim 7, further comprising;

a supervisory device common to each line of each of said unitary systems.

9. An optical transmission system using Raman amplification according to claim 8, wherein said first pumping light supplying section and said second pumping light supplying section have a plurality of pumping light sources generating pumping light of different wavelengths, respectively, and said supervisory device superimposes a supervisory signal on the pumping light generated by at least one pumping light source in said first pumping light supplying section, and also superimposes the supervisory signal on the pumping light generated by at least one pumping light source in said second pumping light supplying section.

10. An optical transmission system using Raman amplification according to claim 9,
wherein said supervisory device detects the supervisory signal included in the signal light Raman amplified on each line of each of said unitary systems, by using optical filters capable of extracting light in the vicinity of a Raman gain peak wavelength occurring by the pumping light on which the supervisory signal is superimposed.

11. An optical transmission system using Raman amplification according to claim 9,
wherein said supervisory device superimposes the supervisory signal on the pumping light at a long wavelength side among a plurality of pumping light generated by said plurality of pumping light sources.

* * * * *

UNITED STATES PATENT AND TRADEMARK OFFICE
CERTIFICATE OF CORRECTION

PATENT NO. : 6,985,285 B2 Page 1 of 1
APPLICATION NO. : 10/281317
DATED : January 10, 2006
INVENTOR(S) : Toshiki Tanaka It is certified that error appears in the above-identified patent and that said Letters Patent is hereby corrected as shown below:

On Title Page, Col. 2 Item 56 FOREGN PATENT DOCUMENTS, after "1/1986 insert –HO45/14/00--

On Title Page, Col. 2 Item 56 FOREGN PATENT DOCUMENTS, after "5/1996 insert –HO4B/10/02--

On Title Page, Col. 2 Item 56 FOREGN PATENT DOCUMENTS, after "12/1996 insert –HO4B/10/02--

On Title Page, Col. 2 Item 56 FOREGN PATENT DOCUMENTS, after "3/2002 insert –HO4B/10/18--

Column 19, line 5 in claim 1 delete "Roman" and insert --Raman--

Signed and Sealed this

Fifteenth Day of August, 2006

JON W. DUDAS
*Director of the United States Patent and Trademark Office*